United States Patent
Kahkoska

(10) Patent No.: US 9,473,381 B2
(45) Date of Patent: Oct. 18, 2016

(54) SYSTEMS AND METHODS FOR NETWORK TESTING

(71) Applicant: James Kahkoska, Plano, TX (US)

(72) Inventor: James Kahkoska, Plano, TX (US)

(73) Assignee: AirMagnet, Inc., Westford, MA (US)

( * ) Notice: Subject to any disclaimer, the term of this patent is extended or adjusted under 35 U.S.C. 154(b) by 393 days.

(21) Appl. No.: 13/791,082

(22) Filed: Mar. 8, 2013

(65) Prior Publication Data

US 2014/0258504 A1    Sep. 11, 2014

(51) Int. Cl.
*H04L 12/26* (2006.01)
*G06F 15/173* (2006.01)
*H04L 12/24* (2006.01)

(52) U.S. Cl.
CPC ............ *H04L 43/50* (2013.01); *H04L 41/22* (2013.01); *H04L 41/24* (2013.01); *H04L 43/12* (2013.01); *Y04S 40/168* (2013.01)

(58) Field of Classification Search
CPC ...................................................... H04L 43/50
USPC ........................................................ 709/224
See application file for complete search history.

(56) References Cited

U.S. PATENT DOCUMENTS

| 2004/0121648 A1* | 6/2004 | Voros ............... H01R 13/6215 439/535 |
| 2007/0081549 A1* | 4/2007 | Cicchetti ............... H04L 12/10 370/447 |
| 2007/0233858 A1* | 10/2007 | Goff ..................... H04L 12/10 709/224 |
| 2012/0209934 A1* | 8/2012 | Smedman ........... H04L 12/5692 709/208 |
| 2013/0169050 A1* | 7/2013 | Tseng ..................... H04L 12/10 307/65 |

* cited by examiner

*Primary Examiner* — Suraj Joshi
(74) *Attorney, Agent, or Firm* — Locke Lord LLP; Scott D. Wofsy; Christopher J. Capelli

(57) ABSTRACT

A apparatus for network testing includes a network port adapted to receive data from the test network and one or more network interfaces of a wireless access point in operative communication with the network port. The one or more network interfaces generates a wireless local area network (WLAN) that communicates diagnostic information of the test network to a client device and causes the client device to display the diagnostic information.

15 Claims, 7 Drawing Sheets

SYSTEMS AND METHODS FOR NETWORK TESTING

BACKGROUND OF THE INVENTION

1. Field of the Invention

The present disclosure relates to network testing and network troubleshooting, and more particularly, to improved systems and methods for network testing devices that employ a wireless local area network (WLAN).

2. Description of the Related Art

In order for handheld network testing devices to properly satisfy network testing needs for increasingly complex communication networks, additional processing power coupled to higher resolution color displays (e.g., liquid crystal displays (LCDs)) have become commonplace. For example, conventional network testing devices display a host of network information (e.g., network diagnostics/conditions) on resident high resolution displays. However, such network testing devices have also become heavier, larger and more expensive.

Although such conventional network devices have generally been considered satisfactory for their intended purpose, there is still a need in the art for less expensive, smaller form factor network testing devices without compromising network testing functionality. The present invention provides a solution for these problems.

SUMMARY

The purpose and advantages of the present invention will be set forth in and become apparent from this disclosure. Additional advantages of the invention will be realized and attained by the methods and systems particularly pointed out in the written description and claims hereof, as well as from the appended drawings.

To achieve these and other advantages and in accordance with the purpose of the invention, as embodied herein, the invention includes an apparatus for network testing. The apparatus has a network port (e.g., a hardwired port, a RJ-45 network port, etc.) that receives data from the test network. The apparatus further including one or more network interfaces of a wireless access point operatively coupled to the network port. The one or more network interfaces generate a wireless local area network (WLAN) that communicates diagnostic information of the test network to a client device and causes the client device to display the diagnostic information. Such diagnostic information of the test network can include, for example, a power over Ethernet (PoE) voltage, a test network connection speed and duplex, a dynamic host configuration protocol (DHCP) address, a response time of gateway tests, a response time of server connectivity tests, a nearest switch and port identification, and the like. Notably, in some embodiments, the apparatus can include a display configured and adapted to display one or more network conditions of the test network based on the received data.

In certain other embodiments, the apparatus includes a processor coupled to the network interfaces and adapted to execute one or more processes, and a memory configured to store instructions executable by the processor. The instructions, when executed by the processor, cause the processor to generate or create the WLAN via the one or more network interfaces, and advertise a service set identifier (SSID) over the wireless WLAN to cause the client device to display the apparatus as a joinable network. In these embodiments, the instructions can further cause the processor to generate a captive portal via the one or more network interfaces to detect wireless activity of the client device, and transmit diagnostic information of the test network to the client device in response to detected wireless activity causing the client device to display the diagnostic information.

Additionally, the display is configured and adapted to display the one or more network conditions via corresponding light emitting diodes (LEDs). For example, the processor can power corresponding LEDs based on the received data to indicate the one or more network conditions.

In some embodiments, the apparatus includes an independent power source (e.g., a battery, etc.) enclosed by the housing member. As discussed above, a processor can execute instructions. Such instructions, when executed by the processor, can further cause the processor to determine if the apparatus receives power over Ethernet (PoE) via the network port, power the apparatus by the PoE when received, and power the apparatus by the independent power source when the PoE is not received.

In certain other embodiments, the instructions, when executed by the processor further cause the processor to receive, at a network test apparatus, an Internet Protocol (IP) address from test network, and bridge the IP address of the test network with an IP address of the client device via the WLAN to cause the client device to acquire the IP address of the test network.

In certain other embodiments of the disclosure, a method for network testing provides steps for communicating data from a test network via a port on a network test apparatus, determining one or more network conditions of the test network based on the received data, displaying, via a display of the network test apparatus, the one or more conditions. For example, in some embodiments, such displaying can include steps to powering at least one light emitting diode (LED) coupled to the network test apparatus associated with a corresponding network condition. The method for network testing also includes steps for generating, via one or more network interfaces of the network test apparatus, a wireless local area network (WLAN), and transmitting diagnostic information of the test network via the WLAN to a client device to cause the client device to display the diagnostic information. Optionally, the method can provide steps for advertising a service set identifier (SSID) for the WLAN via the one or more network interfaces of the network test apparatus to cause the client device to display the network test apparatus as an available network.

In some embodiments, the steps for transmitting diagnostic information of the test network via the WLAN to the client device can further include steps for generating a captive portal that detects wireless activity of the client device, and transmitting diagnostic information of the test network to the client device in response to detected wireless activity causing the client device to display the diagnostic information.

In other embodiments, the method for network testing can include steps for receiving, from the test network, power over Ethernet (PoE) via the network port of the network test apparatus, and powering the network test apparatus with the PoE. Additionally, in these embodiments, the method can include steps for powering the apparatus via an internal power source when the power over Ethernet (PoE) is not received at the network port of the network test apparatus.

In additional embodiments, as disclosed herein, the method for network testing can include receiving, at the network test apparatus, an Internet Protocol (IP) address from test network, and bridging the IP address of the test network with an IP address of the client device via the WLAN to cause the client device to acquire the IP address of the test network.

Further still, some embodiments in accordance with this disclosure provide a tangible, non-transitory, computer-readable media having software encoded thereon. The software when executed by processor operable to receive data from a test network via a port on a network test apparatus, and determine one or more network conditions of the test network based on the received data. Further, the software, when executed can cause the processor to display, via a display of the network test apparatus, the one or more conditions, generate, via one or more network interfaces of the network test apparatus, a wireless local area network (WLAN), and advertise, via the one or more network interfaces of the network test apparatus, a service set identifier (SSID) for the WLAN to cause a client device to display the network test apparatus as an available network. Additionally, the processor, when executing the software can generate a captive portal that detects wireless activity of the client device, and transmit diagnostic information of the test network to the client device in response to detected wireless activity causing the client device to display the diagnostic information.

In further embodiments, the software, when executed by a processor, is further operable to receive, at a network test apparatus, an Internet Protocol (IP) address from test network, and bridge the IP address of the test network with an IP address of the client device via the WLAN to cause the client device to acquire the IP address of the test network. Additionally, the processor, when executing the software, can be operable to determine if the apparatus receives power over Ethernet (PoE) via the network port, power the apparatus by the PoE when received, and power the apparatus by the independent power source when the PoE is not received. In some embodiments, the processor is further operable to reduce power transmission to the one or more network interfaces to limit a range of the WLAN.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein:

FIG. 1A is a partial view of a display of the network tester shown in FIG. 1, displaying one or more network conditions of the test network;

DESCRIPTION OF THE INVENTION

The systems, techniques and processes described herein, provide for improved network test devices that are less expensive to manufacture and include a smaller form factor than conventional network testing devices. Such systems, techniques and processes achieve these and other needs by providing a network test device having basic display options for test network conditions while pushing in-depth diagnostic information to a client device via a WLAN. In particular, the devices described herein provide a smaller form factor and lower manufacturing cost, while still providing in-depth diagnostic test network information and network troubleshooting options.

Figure 1:
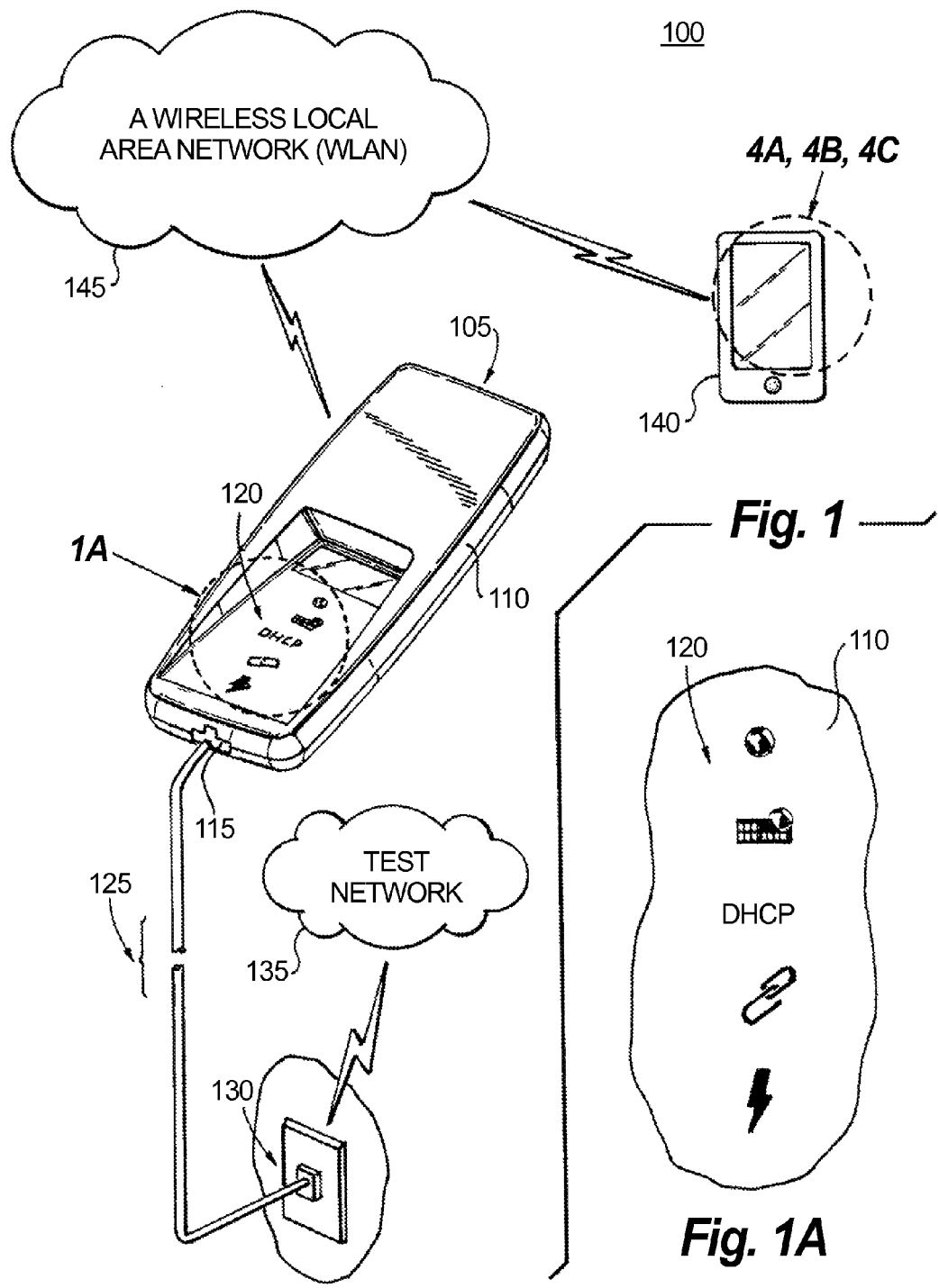
FIG. 1 is a schematic diagram of an exemplary embodiment of a network tester constructed in accordance with the present invention, showing a test network and a wireless local area network (WLAN)

Reference will now be made to the drawings wherein like reference numerals identify similar structural features or aspects of the subject invention. For purposes of explanation and illustration, and not limitation, a partial view of an exemplary embodiment of the network testing device in accordance with the invention is shown in FIG. 1 and is designated generally by reference character 105. Other embodiments of the network testing device in accordance with the invention, or aspects thereof, are provided in FIGS. 1-5, as will be described. The system of the invention can be used for performing network diagnostic testing and displaying test network conditions.

Referring now to FIG. 1, a schematic diagram 100 shows a network tester 105 in accordance with the present disclosure. Operatively, network tester 105 includes a housing member 110 configured and adapted to communicate (e.g., transmit and receive data) with a communication network 135 (i.e., test network) preferably via a network port 115. In the illustrated embodiment, the network port 115 is a hardwired port configured as RJ-45 network port. It is to be understood, however, that other embodiments are not to be limited to using a RJ-45 port, and any suitable port for coupling to communication network 135 may be used. For example, network port 115 can also include a wireless access port that couples to test network 135. Notably, an Ethernet network cable 125 can operatively couple network test device 105 (e.g., via network port 115) to a test network 135 (e.g., via a network port 130). Notably, network port 130 can be a conventional network port present in commercial buildings, residential spaces, etc., which port can include wiring necessary to provide connectivity to a network 135 (e.g., the Internet).

Network 135 is to be understood to include a communication network that can include various network devices (e.g., such as personal computers and workstations, or other devices, such as sensors, etc.) interconnected by communication links and segments for transporting data therebetween. Many types of networks are available, ranging from local area networks (LANs) to wide area networks (WANs). LANs typically connect the network devices over dedicated private communications links located in the same general physical location, such as a building or campus. WANs, on the other hand, typically connect geographically dispersed network devices over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others.

Referring now to FIG. 1 and FIG. 1A, network tester 105 can also include a display 120 operatively coupled to the housing member 110. The display 120 can be configured and adapted to display one or more network conditions of the test network 135 based on the received data. For example, display 120 can include one or more light emitting diodes (LEDs), which can be powered, based on detection of network conditions such as, but not limited to: power over Ethernet (PoE), a test network connection speed and duplex, a dynamic host configuration protocol (DHCP) address, a gateway test condition, a nearest switch and port identification, and a response time of server connectivity test. The display 120, however, is not to be limited to such LEDs, as other display mechanisms may be used such as LCD, OLED, and other display types capable of displaying information to a user may also be used.

Network tester 105 also includes a one or more network interfaces of a wireless access point 215 enclosed by the housing member. The one or more network interfaces preferably generate a wireless local area network (WLAN) 145 that communicates diagnostic information of test network 135 to a client device 140 and causes client device 140 to display the diagnostic information as discussed below. Client device 140 can include peripheral devices that can preferably include a web browser. Examples of such devices include, but are not limited to: smart phones (an iPhone, an Android smart phone, etc.), tablet devices, laptops, computers, portable devices, etc.

Figure 2:
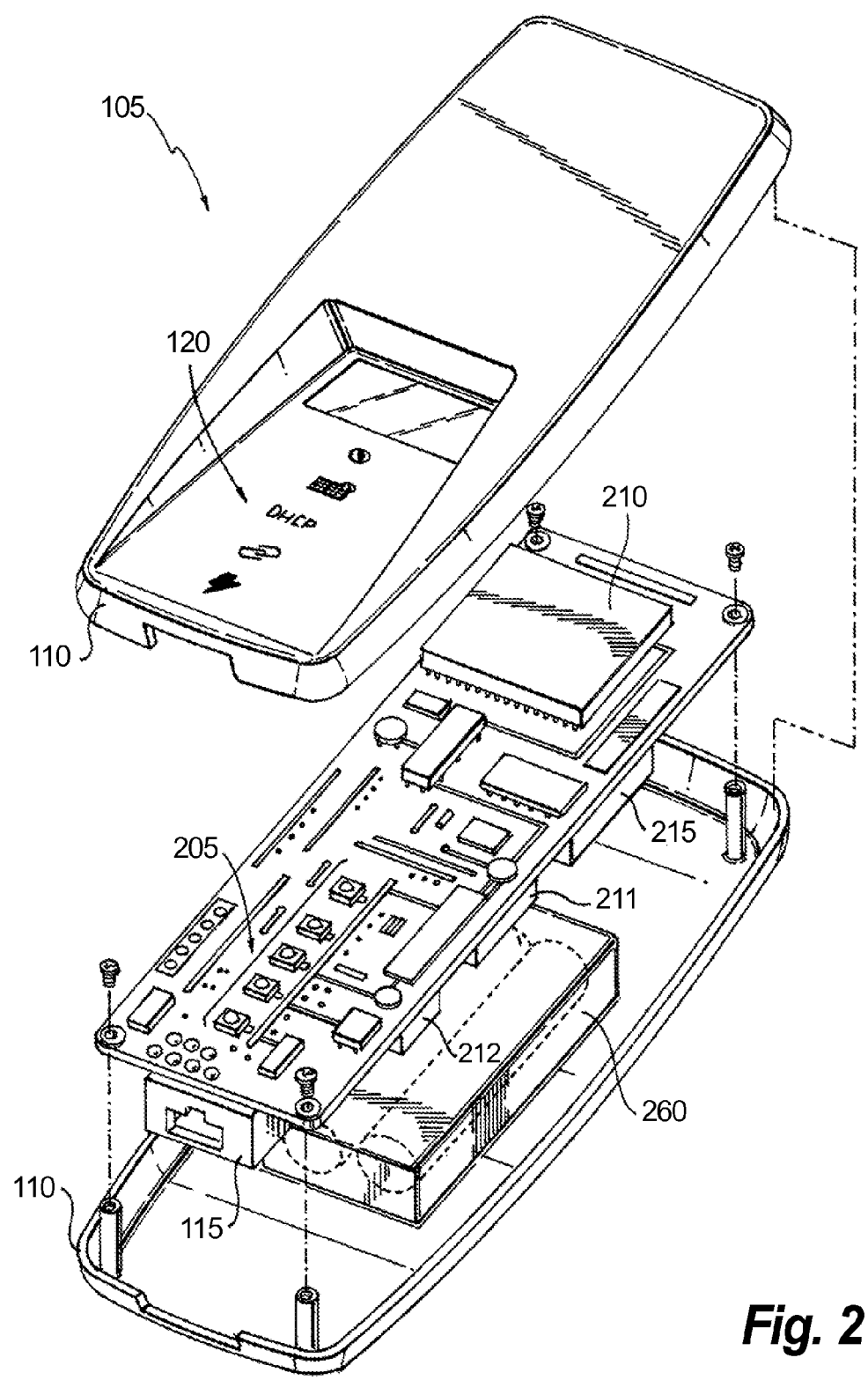
FIG. 2 is an exploded perspective view of the network tester shown in FIG. 1.

With reference now to FIG. 2, there is shown an exploded perspective of the network tester shown in FIG. 1, showing internal components operatively coupled to and/or enclosed by housing 110. As discussed above, network tester 105 includes one or more LEDs 205, which can indicate (e.g., illuminate) one or more network conditions of display 120. Network test device 105 also includes a processor module 210 operatively coupled to the network interfaces of wireless access point 215. The network interfaces of wireless access point 215 can include circuitry to create a wireless local area network (e.g., WLAN 145). Additionally, network test device 105 can include an independent power supply 260 (e.g., a battery, etc.) enclosed by housing member 110.

Figure 3:
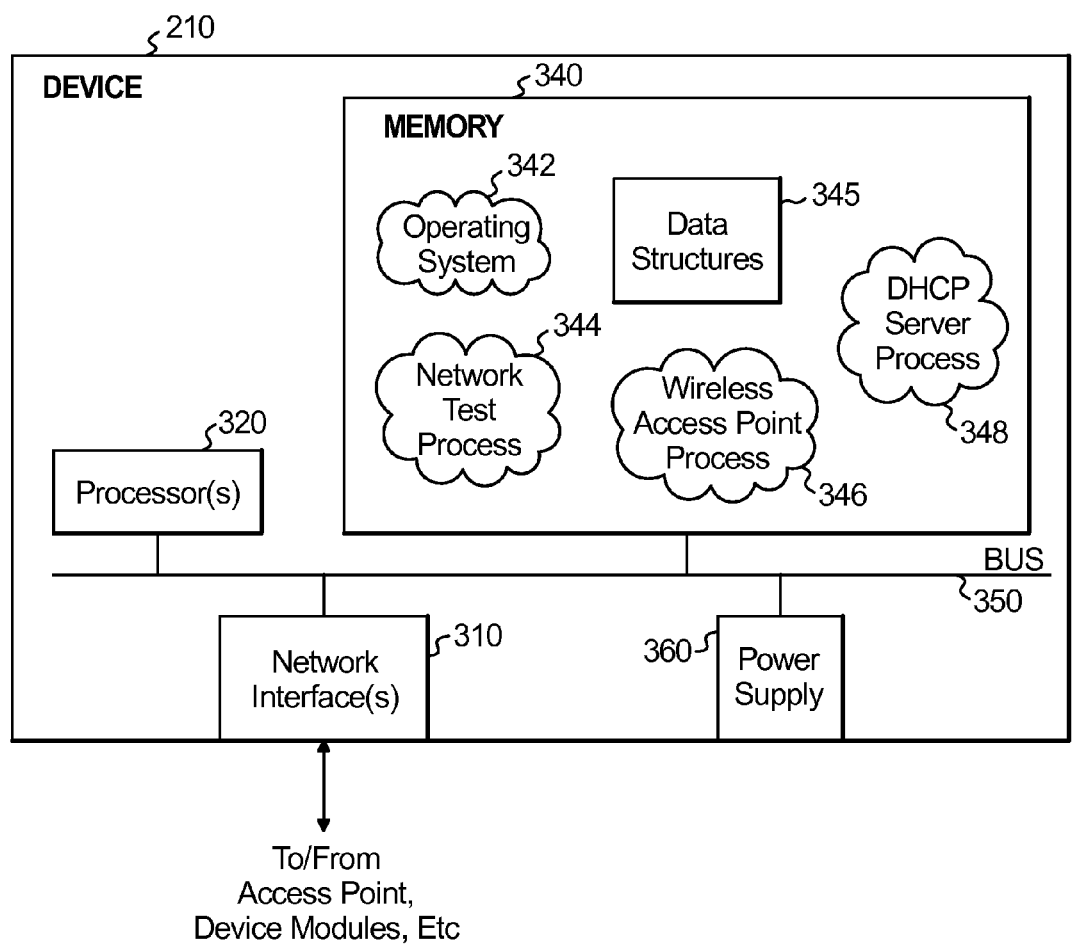
FIG. 3 is a schematic block diagram of an example processor module of the network tester shown in FIG. 1.

FIG. 3 is a schematic block diagram of an example processor module 210 that may be used with one or more embodiments described herein. Processor module 210 may comprise one or more network interfaces 310 (e.g., wired, optical, wireless, etc.), at least one processor 320, and a memory 340 interconnected by a system bus 350. Processor 320 can further include a media access controller (MAC) such as a 10/100, as discussed herein.

Further, processor module 210 includes an independent power supply 260 connected to system bus 350. Although independent power supply 260 is shown as a standalone component in FIG. 2, it is readily appreciated that such power supply 260 can also be incorporated into one or more other modules (i.e., processor module 210), as shown in FIG. 3.

The network interface(s) 310 contain the mechanical, electrical, and signaling circuitry for controlling operation of tester device 105, as well as communicating data to/from wireless local area network 145. Such circuitry, with reference to FIG. 2 can include for example, transformer 211, PHY module 212, wireless access point 215, etc. Further, the network interfaces 310 may be configured to transmit and/or receive data using a variety of different communication protocols.

Memory 340 comprises a plurality of storage locations that are addressable by the processor 320 and the network interfaces 310 for storing software programs and data structures associated with the embodiments described herein. Note that certain embodiments of processor module 210 may have limited memory or no memory (e.g., no memory for storage other than for programs/processes operating on the device and associated caches). The processor 320 may comprise hardware elements or hardware logic adapted to execute the software programs and manipulate the data structures 245. An operating system 342, portions of which are typically resident in memory 340 and executed by the processor, functionally organizes the device by, inter alia, invoking operations in support of software processes and/or services executing on the device. These software processes and/or services may comprise a illustrative network test process/services 344, a wireless access point process/services 346 and a DHCP server process/service 348, as described herein. Note that while these processes/services are shown in centralized memory 340, alternative embodiments provide for specific operation within the network interfaces 310.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Network test process (services) 344 contains computer executable instructions executed by the processor 320 to perform network test functions provided by one or more communication and/or routing protocols, as will be understood by those skilled in the art, and as modified according to the techniques described herein. These functions may, for example, be capable of general packet detection/routing/forwarding, etc., according to the associated protocols and the techniques described herein, and using various routing/forwarding tables, lists, mappings, etc. (e.g., data structures 345).

In particular, network test process 344 can cause processor 320 (e.g., via network interfaces 310) to receive data communicated from test network 135 to network test device 105 (e.g., via network port 115). Network test process 344 can also cause processor 320 to determine or detect network conditions of test network 135 based on the received network data and cause display 120 to display one or more of these network conditions. For example, processor 320 can cause power supply 360 to power one or more LEDs associated with a corresponding network condition.

In operation, referring collectively to FIGS. 1-3, network test device 105 connects to test network 135. Once connected to test network 135, network test process 344 causes processor 320 to detect power over Ethernet (PoE) from test network 135. If PoE is present, a voltage is measured. In some embodiments, processor 320 can determine if network test device 105 receives PoE and powers the apparatus by the PoE when received and/or powers the apparatus by independent power supply 360 when PoE is not received. Further, once PoE is detected, processor 320 can power a corresponding LED 205.

Network test process 344 can also cause processor to test a link to test network 135. For example, transformer 211 interfaces to Ethernet wiring 125 via network port 115 and couples the Ethernet wiring to the PHY module/chip 212. PHY module 212 preferably includes a physical layer 1 chip that negotiates link speed and duplex. Processor 320 communicates with PHY module 212 to determine if a link is established and can further power a corresponding "LINK" LED (e.g., cause "LINK" LED to illuminate).

Once the PHY module 212 links to test network 135, network test process 344 can initiate an Ethernet frame oriented testing. The medium access controller (MAC) of processor 320 provides addressing and channel access control mechanisms and can reassemble the frames by converting a serial data stream from PHY 212 into frames in memory 340, which can be used to communicate with and troubleshoot test network 135. For example, processor 320 can use the stored frames to acquire an Internet Protocol (IP) address from test network 135 (e.g., via Dynamic Host Configuration Protocol (DHCP)). Again, as discussed above with respect to a "LINK" LED, a successful DHCP test can cause a corresponding LED of display 120 to power on. Notably, a successful DHCP response yields a default router. Network test process 344 can further include an Internet Control Message Protocol (ICMP) ping to a default router. If successful, a corresponding "GATE" LED can be illuminated. Additionally, network test process 344 can also verify connectivity to a web server via, for example, an ICMP Ping or a Transmission Control Protocol (TCP) port open validation request (e.g., testing network test device 105 can reach a website). If successful, a corresponding "WEB" LED can be illuminated.

Although steps or elements of network test process 344 are discussed in relation to each other, such ordering is for purposes of explanation and not limitation. That is, such elements of network test process 344 can be performed in any order and independent of each other.

Wireless access point process (services) 346, like network test process 344 contains computer executable instructions executed by the processor 320 to perform network test functions provided by one or more communication and/or routing protocols (e.g., 802 wireless protocols), as will be understood by those skilled in the art, and as modified according to the techniques described herein. Particularly, wireless access point process 346 causes processor 320 to generate a wireless local area network (WLAN) 145 wirelessly that communicates diagnostic information of test network 135 to client device 140, as discussed below.

In particular, wireless access point process 346 can cause processor 320 via network interfaces 310 coupled to access point module 215, to generate WLAN 145 and preferably advertise a service set identifier (SSID) over WLAN 145. In turn, client device 140 can display network test device 105 as a joinable network. For example, client device 140 "sees" or receives the advertisements or beacons of all available access points and can present a list for a user to select from. In turn, the user can select the SSID of the tester 105 to connect client device 140 to network test device 105 via WLAN 145.

Optionally, in some embodiments connecting to network test device 105 can require a pre-shared key using common authentication schemes such as WEP and WPA to prevent unwanted connections or associations to network test device 105. As an additional security measure, a power level of the access point module 215 can be adjusted (e.g., lowered) thereby limiting a range of operation of WLAN 145. Such power level can lowered using specific antenna designs, Wi-Fi radio programmability, and combinations thereof.

Once client device 140 is associated with network test device 105, client device 140 can acquire an IP address from DHCP server process 346. DHCP server process 346 provides an automated way to distribute and update IP addresses of client device(s) 140 and other configuration information on WLAN 145. For example, DHCP server process 346 can exchange a series of messages with client device 140, known as the DHCP conversation or the DHCP transaction, as understood by those skilled in the art. In this fashion, client device 140 can acquire an IP address from network test device 105. Once client device 140 receives the IP address from network test device 105, a web browser of client device 140 can be used to provide a user interface of additional diagnostic information or test parameters of test network 135 to the user. For example, such diagnostic information can include, but is not limited to: power over Ethernet (PoE) voltage, test network connection speed and duplex, dynamic host configuration protocol (DHCP) address, response time of gateway tests, and response time of server connectivity tests, and the like.

Referring again to wireless access point process 346, the computer executable instructions executed by the processor 320 can further include a sub-process such as a web server process (not shown) to communicate with client device 140 using Hypertext Markup Language (HTML). This web server process can transmit HTML to client device 140 and cause client device 140 (e.g., via a browser) to render or display a network testing user interface thereby displaying the diagnostic information of the test network 135. For example, as discussed above, client device 140 can be associated with the SSID of network test device 105. Accordingly, the web server process can generate a captive portal that detects wireless activity of the client device 140 and transmits the diagnostic information of the test network to the client device in response to detected wireless activity causing the client device to display the additional diagnostic information. In this fashion, the captive portal can intercept client device activity and provide specific data for display. In this fashion, any web page client device 140 attempts to open will render a test network web page provided by the captive portal of the web server process.

In certain additional embodiments, network test device 105 can provide a bridging function between client device 140 and test network 135. This bridging function can allow connectivity between client device 140 using, for example WiFi, to the network port 115. The bridging function can be transparent to allow client device 140 to acquire a test network IP address and communicate with additional network resources on test network 135.

Figure 4A:
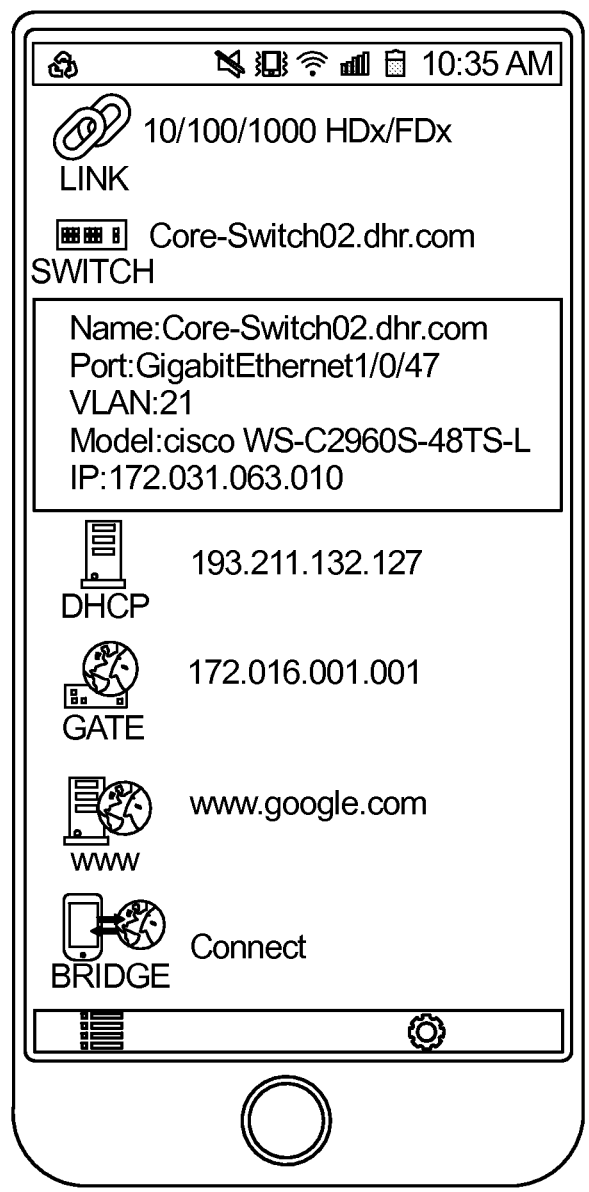
FIGS. 4A-4C are diagrams of the client device of FIG. 1, showing a user interface that provides diagnostic information of the test network.
Figure 4B:
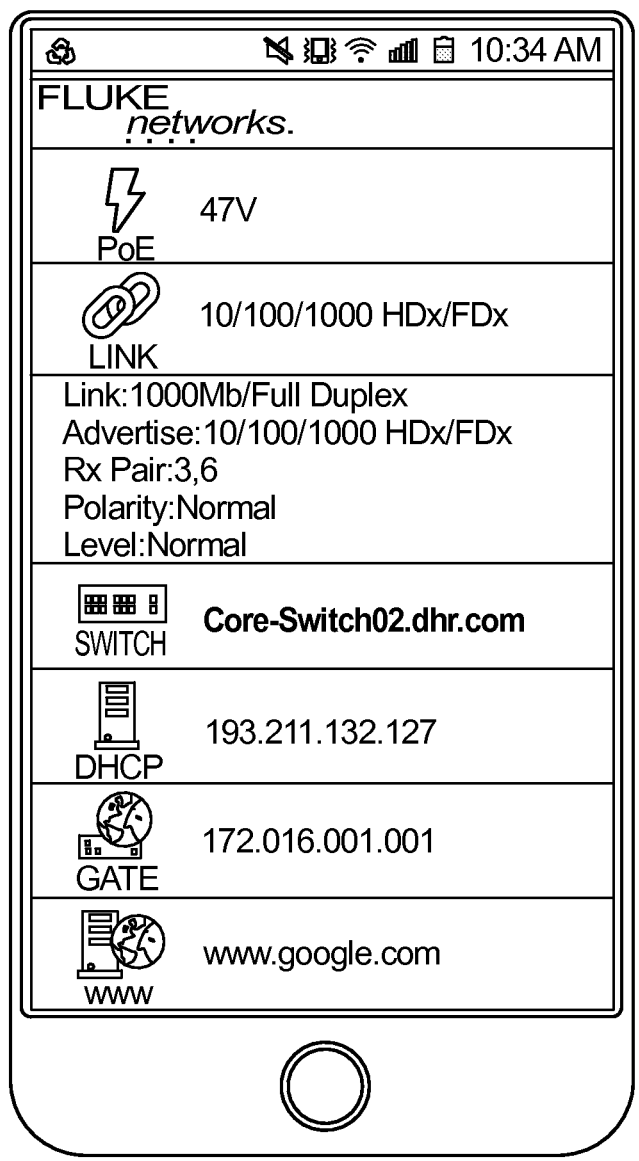
Figure 4C:
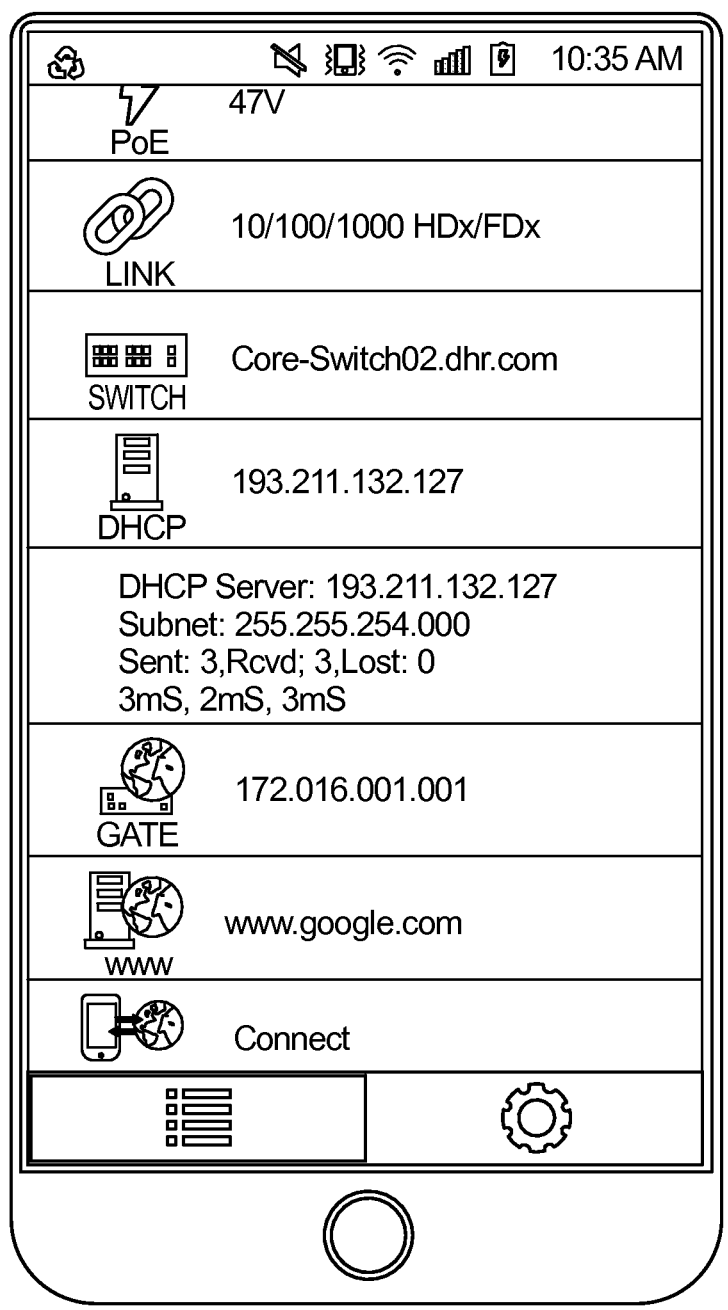

Referring now to FIGS. 4A-4C, the client device of FIG. 1 is shown. As discussed above, network test device 105 can transmit diagnostic information of test network 135 to client device 140 causing client device 140 to display such information. As shown in FIGS. 4A-4C such the diagnostic information can be displayed as a scrollable list on client device 140 and can include, for example, actual PoE voltage, speed and duplex of the network connection, actual DHCP address received, as well as the response times of the gateway and www server connectivity tests. Additionally, certain functionality such as the bridge functionality discussed above, can be provided for display on client device 140. Such functionality can be selectable by client device 140 and invoke corresponding processes from network test device 105, as discussed above.

Figure 5:
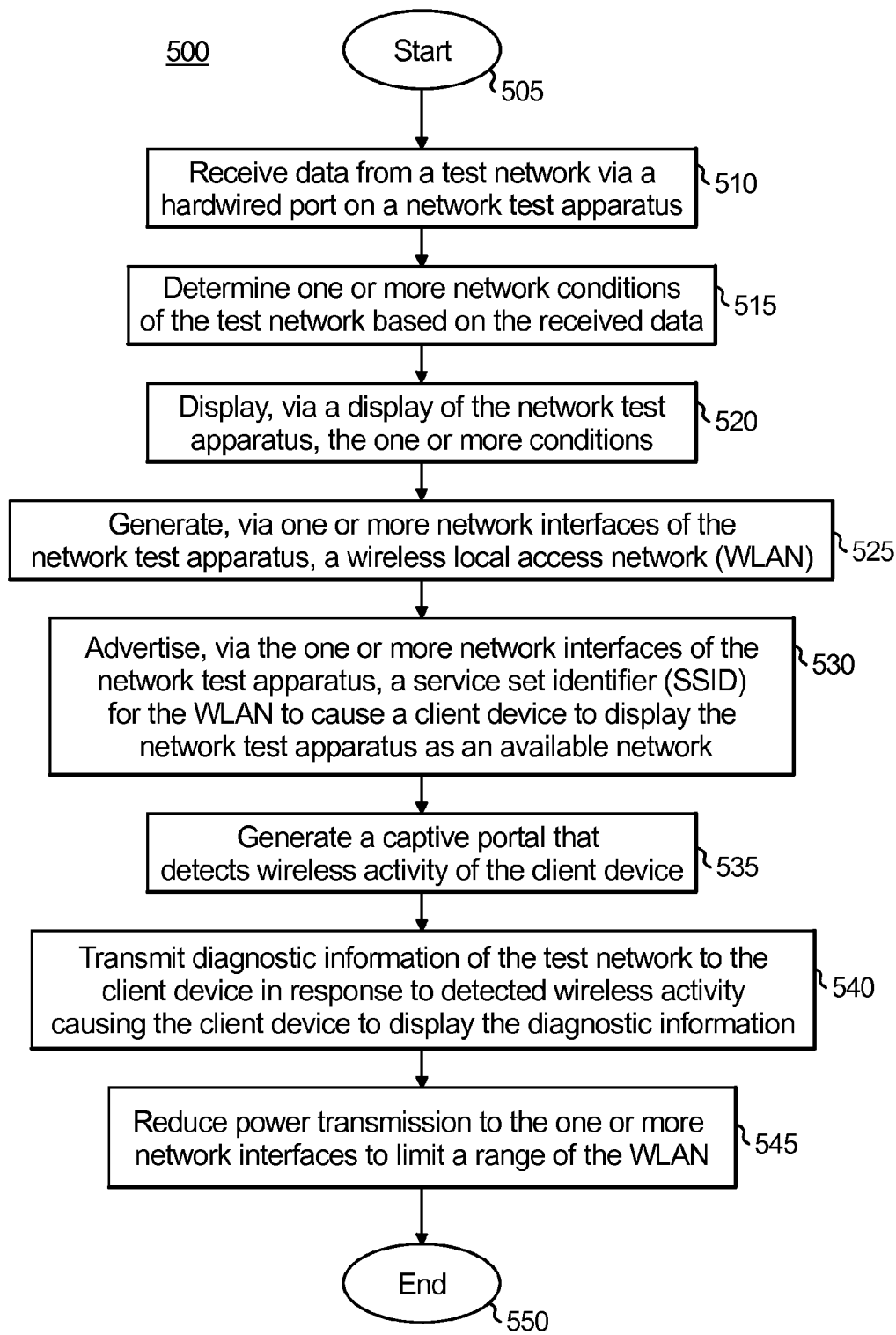
FIG. 5 illustrates an example simplified procedure for network testing in accordance with one or more embodiments described herein.

FIG. 5 illustrates an example simplified procedure, i.e., procedure 500, for network testing in accordance with one or more embodiments described herein, particularly from the perspective of the network test device 105. Procedure 500 starts at step 505, and continues to step 510, where, as described in greater detail above, the network testing device can receive data from a test network via a port on a network test apparatus. Next, in step 515, the network test device can determine one or more network conditions of the test network based on the received data and in step 520, can display (e.g., via display 120) the one or more conditions. The network test device, in step 525 can further generate a wireless local area network (WLAN) via one or more network interfaces and, in step 530, can advertise a service set identifier (SSID) for the WLAN to cause a client device to display the network test apparatus as an available network. Optionally, in some embodiments, the network test device can generate a captive portal that detects wireless activity of the client device, as shown in step 535. In such embodiments, in step 540, the network test device can transmit diagnostic information of the test network to the client device in response to detected wireless activity thereby causing the client device to display the diagnostic information. Additionally, as discussed above, the network test device can reduce power transmission to the one or more network interfaces to limit a range of the WLAN, as in step 545, to prevent unwanted client devices from joining it. The procedure 500 subsequently may end in step 545, or, may restart at step 505.

It should be noted that certain steps within procedure 500 may be optional and further, the steps shown are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The systems, techniques and processes described herein, provide for improved network test devices that are less expensive to manufacture and include a smaller form factor than conventional network testing devices. Such systems, techniques and processes achieve these and other needs by providing a network test device having basic display options (e.g., LEDs) for test network conditions while pushing in-depth diagnostic information to a client device via a WLAN. In particular, the devices described herein provide a smaller form factor and lower manufacturing cost, while still providing in-depth diagnostic test network information and network troubleshooting options.

While there have been shown and described illustrative embodiments that provide for an improved network testing device, it is to be understood that various other adaptations and modifications may be made within the spirit and scope of the embodiments herein. For example, the embodiments have been shown and described herein with relation to specific 802 wireless protocols. However, the embodiments in their broader sense are not as limited, and may, in fact, be used with various other types of wireless protocols (e.g., Bluetooth, NFC technologies, and the like).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. An apparatus for network testing comprising:
   a network port configured to receive data from the test network;
   one or more network interfaces of a wireless access point in operative communication with the network port;
   an internal power source;
   a processor coupled to the one or more network interfaces and configured to execute one or more processes; and
   a memory configured to store instructions executable by the processor, the instructions, when executed by the processor, cause the processor to:
      automatically determine if the apparatus receives power over Ethernet (PoE) via the network port and automatically measure voltage from the test network if it is determined POE is received;
      selectively power the apparatus by the PoE responsive to determination the POE is received or by the internal power source responsive to determination that the POE is not received;
      generate a wireless local area network (WLAN) via the one or more network interfaces;
      advertise a service set identifier (SSID) over the WLAN to cause the client device to display the apparatus as a joinable network;
      generate a captive portal via the one or more network interfaces to detect wireless activity of the client device; and
      transmit, by the captive portal, diagnostic information of the test network to the client device in response to detected wireless activity causing the client device to display the diagnostic information.

2. The apparatus of claim 1, wherein the display further comprises:
   one or more light emitting diodes (LEDs);
   wherein the instructions, when executed by the processor, further cause the processor to:
      power at least one of the LEDs coupled to the network test apparatus associated with a corresponding network condition based on the received data.

3. The apparatus of claim 1, wherein the instructions, when executed by the processor further cause the processor to:
   receive, at a network test apparatus, an Internet Protocol (IP) address from test network; and
   bridge the IP address of the test network with an IP address of the client device via the WLAN to cause the client device to acquire the IP address of the test network.

4. The apparatus of claim 1, wherein the network port is an RJ-45 connection port.

5. The apparatus of claim 1, wherein the diagnostic information of the test network includes at least one of a power over Ethernet (PoE) voltage, a test network connection speed and duplex, a nearest switch and port identification, a dynamic host configuration protocol (DHCP) address, a response time of gateway tests, and a response time of server connectivity tests.

6. The apparatus of claim 1, further comprising:
   a display configured and adapted to display one or more network conditions of the test network based on the received data.

7. The apparatus of claim 1, wherein the client device is configured and adapted to communicate with the apparatus via a web browser, wherein the client device includes at least one of a mobile phone, a tablet, and a computer.

8. A method, comprising:
automatically determining if a network test apparatus receives power over Ethernet (PoE) via a port of the network test apparatus and automatically measure voltage from a test network if it is determined POE is received;
selectively powering the network test apparatus by the PoE responsive to determination the POE is received by the network test apparatus or by an internal power source responsive to determination that the POE is not received by the network test apparatus;
receiving data from a test network via the port on the network test apparatus;
determining one or more network conditions of the test network based on the received data;
generating, via one or more network interfaces of the network test apparatus, a wireless local area network (WLAN);
advertising, via the one or more network interfaces of the network test apparatus, a service set identifier (SSID) for the WLAN to cause the client device to display the network test apparatus as an available network;
generating a captive portal that detects wireless activity of the client device; and
transmitting, by the captive portal, diagnostic information of the test network to the client device in response to detected wireless activity causing the client device to display the diagnostic information.

9. The method of claim 8, wherein the diagnostic information includes at least one of a power over Ethernet (PoE) voltage, a test network connection speed and duplex, a nearest switch and port identification, a dynamic host configuration protocol (DHCP) address, a response time of gateway tests, and a response time of server connectivity tests.

10. The method of claim 8, wherein the displaying one or more network conditions via the display of the network test apparatus comprises:
powering at least one light emitting diode (LED) coupled to the network test apparatus associated with a corresponding network condition.

11. The method of claim 8, further comprising:
receiving, at the network test apparatus, an Internet Protocol (IP) address from test network; and
bridging the IP address of the test network with an IP address of the client device via the WLAN to cause the client device to acquire the IP address of the test network.

12. The method of claim 8, further comprising:
displaying, via a display of the network test apparatus, the one or more conditions.

13. A tangible, non-transitory, computer-readable media having software encoded thereon, the software when executed by a processor operable to:
automatically determine if a network test apparatus receives power over Ethernet (PoE) via a port of the network test apparatus and automatically measure voltage from a test network if it is determined POE is received;
selectively power the network test apparatus by the PoE responsive to determination the POE is received by the network test apparatus or by an internal power source responsive to determination that the POE is not received by the network test apparatus;
receive data from a test network via the port on the network test apparatus;
determine one or more network conditions of the test network based on the received data;
generate, via one or more network interfaces of the network test apparatus, a wireless local area network (WLAN);
advertise, via the one or more network interfaces of the network test apparatus, a service set identifier (SSID) for the WLAN to cause a client device to display the network test apparatus as an available network;
generate a captive portal that detects wireless activity of the client device; and
transmit, by the captive portal, diagnostic information of the test network to the client device in response to detected wireless activity causing the client device to display the diagnostic information.

14. The computer-readable media of claim 13, wherein the software, when executed by a processor, is further operable to:
receive, at a network test apparatus, an Internet Protocol (IP) address from test network; and
bridge the IP address of the test network with an IP address of the client device via the WLAN to cause the client device to acquire the IP address of the test network.

15. The computer-readable media of claim 13, wherein the software, when executed by the processor, is further operable to:
reduce power transmission to the one or more network interfaces to limit a range of the WLAN.

* * * * *